(12) United States Patent (10) Patent No.: US 7,351,748 B2
Nagashima et al. (45) Date of Patent: Apr. 1, 2008

(54) FLUORINE-CONTAINING WATER-SOLUBLE NONIONIC SURFACE-ACTIVE COMPOUNDS, USE THEREOF AND PROCESS FOR PREPARATION OF THE COMPOUNDS

(75) Inventors: Kouji Nagashima, Settsu (JP); Makoto Hanazawa, Settsu (JP); Yasuo Itami, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 420 days.

(21) Appl. No.: 10/513,785

(22) PCT Filed: Apr. 24, 2003

(86) PCT No.: PCT/JP03/05227

§ 371 (c)(1),
(2), (4) Date: Nov. 16, 2004

(87) PCT Pub. No.: WO03/097717

PCT Pub. Date: Nov. 27, 2003

(65) Prior Publication Data

US 2005/0170989 A1 Aug. 4, 2005

(30) Foreign Application Priority Data

May 16, 2002 (JP) .............................. 2002-141056
Jan. 27, 2003 (JP) .............................. 2003-017964

(51) Int. Cl.
*A61K 8/70* (2006.01)
(52) U.S. Cl. ........................................... 516/9; 516/12
(58) Field of Classification Search ..................... None
See application file for complete search history.

(56) References Cited

U.S. PATENT DOCUMENTS 2,915,554 A 12/1959 Ahlbrecht et al.

(Continued)

FOREIGN PATENT DOCUMENTS

EP 0510239 10/1992

(Continued)

*Primary Examiner*—Gregory Webb
(74) *Attorney, Agent, or Firm*—Kratz, Quintos & Hanson, LLP

(57) ABSTRACT

The present invention provides a fluoroalkyl-group-containing compound that has high water solubility and is highly capable of reducing the surface tension of an aqueous composition. Specifically, the invention relates to a compound represented by formula (1):

$$W—C_nF_{2n}—X—(CH_2CH_2O)_a—Y \quad (1)$$

wherein n is an integer from 2 to 6; W is a hydrogen atom or a fluorine atom; X is -M-O— (wherein R is a lower alkyl a group; and M is an alkylene group optionally substituted with a hydroxyl group), etc.; a is an integer from 10 to 50; and Y is a substituted or unsubstituted alkyl group having 4 to 19 carbon atoms, -M'-$C_mF_{2m}$—W (wherein m is an integer from 2 to 6; W' is a hydrogen atom or a fluorine atom; and M' is an alkylene group optionally substituted with a hydroxyl group), etc.;
the ratio of the molecular weight ($MW_{EO}$) of the polyoxyethylene group (the moiety $(CH_2CH_2O)_a$) to the molecular weight ($MW_F$) of the fluoroalkyl groups (the moieties W—$C_nF_{2n}$ and $C_mF_{2m}$—W') being within the range expressed by the equation:

$$MW_{EO}/MW_F=2.2 \text{ to } 10;$$

and the compound having a Griffin's HLB value of 10 to 16; etc.

16 Claims, 4 Drawing Sheets

Example 2
$^1$H-NMR

U.S. PATENT DOCUMENTS

| | | | | |
|---|---|---|---|---|
| 4,089,804 | A | * | 5/1978 | Falk .............................. 516/9 |
| 4,440,653 | A | * | 4/1984 | Briscoe et al. .............. 507/202 |
| 4,985,550 | A | * | 1/1991 | Charpiot et al. ........... 536/18.4 |

FOREIGN PATENT DOCUMENTS

| | | |
|---|---|---|
| GB | 1371054 | 10/1974 |
| GB | 1377766 | 12/1974 |
| JP | 56-072071 | 6/1981 |
| JP | 57-164199 | 10/1982 |
| JP | 61-047948 | 3/1986 |
| JP | 61-133244 | 6/1986 |
| JP | 9-71547 | 3/1997 |
| JP | 2001-233956 | 8/2001 |
| JP | 2001-269564 | 10/2001 |

* cited by examiner

Example 2
¹H-NMR

Example 8
¹H-NMR

Example 9
¹H–NMR

FLUORINE-CONTAINING WATER-SOLUBLE NONIONIC SURFACE-ACTIVE COMPOUNDS, USE THEREOF AND PROCESS FOR PREPARATION OF THE COMPOUNDS

TECHNICAL FIELD

The present invention relates to a novel fluoroalkyl-group-containing compound, the use thereof, and a process for preparing the compound.

BACKGROUND ART

Generally, fluoroalkyl-group-containing surfactants, when made into aqueous solutions, are capable of greatly reducing surface tension, accordingly providing various properties such as emulsification, dispersion, solubilization, etc. However, they are not easily soluble in water.

Such surfactants are disclosed in, for example, Japanese Unexamined Patent Publications No. 2001-269564 and No. 1986-133244. These surfactants are, however, incapable of reducing surface tension to a satisfactory level, and since they are intended to be used in an organic solvent, they are not desirable in view of their detrimental effects on the environment and work safety.

Japanese Unexamined Patent Publication No. 1981-72071 discloses a case where in order to dissolve a fluorine-containing surfactant having low water solubility in water, the fluorine-containing surfactant must be used in combination with another surfactant.

Japanese Unexamined Patent Publication No. 1986-47948 discloses another kind of application of fluorine-containing surfactants. Such surfactants, however, are not easily soluble in water, so that they need to be used in a limited amount in an aqueous solution or to be used in combination with an organic solvent or other additives for dissolution.

In contrast, Japanese Unexamined Patent Publication No. 1982-164199 discloses a water-soluble fluorine-containing surfactant. The disclosed surfactant, however, dissolves into water as a salt, so that it tends to be influenced by the multicharged ions that are present in the system.

A surfactant containing a long chain fluoroalkyl group (having at least 8 carbon atoms), which has a high fluorine content, is advantageous for lowering surface tension, but it has low water solubility. Meanwhile, when the fluorine content of the surfactant is lowered in order to increase water solubility, surface tension cannot be lowered.

DISCLOSURE OF THE INVENTION

A principal object of the present invention is to provide a fluoroalkyl-group-containing compound that has high water solubility and is highly capable of reducing the surface tension of an aqueous composition. Another object of the invention is to provide uses of the compound and a process for preparing the compound.

More specifically, the present invention provides the following items.

Item 1: A compound represented by formula (1):

$$W-C_nF_{2n}-X-(CH_2CH_2O)_a-Y \quad (1)$$

wherein n is an integer from 2 to 6; W is a hydrogen atom or a fluorine atom; X is $-COO-$, $-SO_2-N(R)-$, $-M-O-$ or $-CH_2O-M-O-$ (wherein R is a lower alkyl group; and M is an alkylene group optionally substituted with a hydroxyl group); a is an integer from 10 to 50; and Y is a substituted or unsubstituted alkyl group having 4 to 19 carbon atoms, a substituted or unsubstituted aryl group, an acyl group, an alkenyl group, an alkynyl group, -M'-$C_mF_{2m}$—W' or -M'-$OCH_2$—$C_mF_{2m}$—W' (wherein m is an integer from 2 to 6; W' is a hydrogen atom or a fluorine atom; and M' is an alkylene group optionally substituted with a hydroxyl group);

the ratio of the molecular weight ($MW_{EO}$) of the polyoxyethylene group (the moiety $(CH_2CH_2O)_a$) to the molecular weight ($MW_F$) of the fluoroalkyl groups (the moieties $W-C_nF_{2n}$ and $C_mF_{2m}$—W') being within the range expressed by the equation:

$$MW_{EO}/MW_F=2.2 \text{ to } 10;$$

and the compound having a Griffin's HLB value of 10 to 16.

Item 2: A compound represented by formula (1)':

$$C_nF_{2n+1}-CH_2CH(OH)CH_2-O-(CH_2CH_2O)_a-Y' \quad (1)'$$

wherein n is an integer from 2 to 6; a is an integer from 15 to 50; and Y' is —$C_bH_{2b+1}$ (wherein b is an integer from 11 to 19) or —$CH_2CH(OH)CH_2$—$C_mF_{2m+1}$ (wherein m is an integer from 2 to 6);

the compound having a Griffin's HLB value of 10 to 16.

Item 3: A compound represented by formula (1)' according to item 2, wherein the ratio of the molecular weight ($MW_{EO}$) of the polyoxyethylene group (the moiety $(CH_2CH_2O)_a$) to the molecular weight ($MW_F$) of the fluoroalkyl groups (the moieties $C_nF_{2n+1}$ and $C_mF_{2m+1}$) is within the range expressed by the equation:

$$MW_{EO}/MW_F=2.2 \text{ to } 10.$$

Item 4: A compound represented by formula (1)' according to item 2 or item 3, wherein a is an integer from 20 to 45.

Item 5: A compound represented by formula (1)' according to any one of items 2 to 4, wherein Y' is —$C_bH_{2b+1}$ (wherein b is an integer from 11 to 19).

Item 6: A compound represented by formula (1)' according to any one of items 2 to 5, wherein Y' is —$(CH_2)_bH$ (wherein b is an integer from 11 to 19).

Item 7: A compound represented by formula (1)' according to item 6, wherein n is 4; a is an integer from 20 to 45; and b is an integer from 11 to 17.

Item 8: A compound represented by formula (1)' according to any one of items 2 to 4, wherein Y' is —$CH_2CH(OH)CH_2$—$C_mF_{2m+1}$ (wherein m is an integer from 2 to 6).

Item 9: A compound represented by formula (1)' according to item 8, wherein n is 4; m is 4; and a is an integer from 20 to 45.

Item 10: A compound according to item 1, wherein the compound is represented by:

$C_4F_9$—COO—$(CH_2CH_2O)_{23}$—$C_{12}H_{25}$,
$C_4F_9$—$SO_2N(CH_3)$—$(CH_2CH_2O)_{21}$—$C_{12}H_{25}$,
$C_4F_9$—$CH_2CH_2O$—$(CH_2CH_2O)_{25}$—$C_{12}H_{25}$,
$H(CF_2)_4$—$CH_2OCH_2CH(OH)CH_2O$—$(CH_2CH_2O)_{21}$—$C_{14}H_{29}$,
$C_4F_9$—$CH_2CH(OH)CH_2O$—$(CH_2CH_2O)_{21}$—$C_{12}H_{25}$,
$C_4F_9$—$CH_2CH(OH)CH_2O$—$(CH_2CH_2O)_{25}$—$C_{12}H_{25}$,
$C_4F_9$—$CH_2CH(OH)CH_2O$—$(CH_2CH_2O)_{30}$—$C_{12}H_{25}$,
$C_4F_9$—$CH_2CH(OH)CH_2O$—$(CH_2CH_2O)_{20}$—$C_{14}H_{29}$,
$C_4F_9$—$CH_2CH(OH)CH_2O$—$(CH_2CH_2O)_{30}$—$C_{14}H_{29}$,
$C_4F_9$—$CH_2CH(OH)CH_2O$—$(CH_2CH_2O)_{23}$—$C_{16}H_{33}$,
$C_4F_9$—$CH_2CH(OH)CH_2O$—$(CH_2CH_2O)_{20}$—$C_{16}H_{33}$,
$C_4F_9$—$CH_2CH(OH)CH_2O$—$(CH_2CH_2O)_{25}$—$C_{16}H_{33}$, $C_4F_9$—$CH_2CH(OH)CH_2O$—$(CH_2CH_2O)_{30}$—$C_{16}H_{33}$,
$C_4F_9$—$CH_2CH(OH)CH_2O$—$(CH_2CH_2O)_{40}$—$C_{16}H_{33}$,
$C_4F_9$—$CH_2CH(OH)CH_2O$—$(CH_2CH_2O)_{20}$—$C_{18}H_{37}$,
$C_4F_9$—$CH_2CH(OH)CH_2O$—$(CH_2CH_2O)_{30}$—$C_{18}H_{37}$,
$C_4F_9$—$CH_2CH(OH)CH_2O$—$(CH_2CH_2O)_{40}$—$C_{18}H_{37}$,
$C_4F_9$—$CH_2CH(OH)CH_2O$—$(CH_2CH_2O)_{23}$—$CH_2CH(OH)$ $CH_2$—$C_4F_9$,
$C_4F_9$—$CH_2CH(OH)CH_2O$—$(CH_2CH_2O)_{35}$—$CH_2CH(OH)$ $CH_2$—$C_4F_9$, or
$C_4F_9$—$CH_2CH(OH)CH_2O$—$(CH_2CH_2O)_{45}$—$CH_2CH(OH)$ $CH_2$—$C_4F_9$.

Item 11: A surfactant comprising a compound according to any one of items 1 to 10.

Item 12: An antistatic agent comprising a compound according to any one of items 1 to 10.

Item 13: A concentrated aqueous solution comprising a compound according to any one of items 1 to 10.

Item 14: An aqueous coating composition comprising a compound according to any one of items 1 to 10.

Item 15: An aqueous ink composition comprising a compound according to any one of items 1 to 10.

Item 16: A photographic photosensitive material comprising a compound according to any one of items 1 to 10.

Item 17: A process for preparing a compound represented by formula (1a):

$$W—C_nF_{2n}—CH_2CH(OH)CH_2—O—(CH_2CH_2O)_a—Y \quad (1a)$$

wherein n is an integer from 2 to 6; W is a hydrogen atom or a fluorine atom; a is an integer from 10 to 50; and Y is a substituted or unsubstituted alkyl group having 4 to 19 carbon atoms, a substituted or unsubstituted aryl group, an acyl group, an alkenyl group, an alkynyl group, -M'-$C_mF_{2m}$—W' or -M'-$OCH_2$—$C_mF_{2m}$—W' (wherein m is an integer from 2 to 6; W' is a hydrogen atom or a fluorine atom; and M' is an alkylene group optionally substituted with a hydroxyl group), comprising reacting a compound represented by formula (4):

$$HO—(CH_2CH_2O)_a—Y \quad (4)$$

wherein a and Y are as defined above;
with a compound represented by formula (2):

wherein n and W are as defined above.

Item 18: A process for preparing a compound represented by formula (1b):

$$W—C_nF_{2n}—CH_2CH(OH)CH_2—O—(CH_2CH_2O)_a— \\ CH_2CH(OH)CH_2—C_mF_{2m}—W' \quad (1b)$$

wherein n is an integer from 2 to 6; W is a hydrogen atom or a fluorine atom; a is an integer from 10 to 50; m is an integer from 2 to 6; and W' is a hydrogen atom or a fluorine atom, comprising reacting a compound represented by formula (5):

$$HO—(CH_2CH_2O)_a—H \quad (5)$$

wherein a is as defined above;

a compound represented by formula (2):

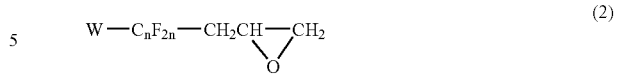

wherein n and W are as defined above;
and a compound represented by formula (3):

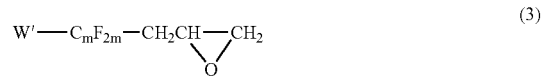

wherein m and W' are as defined above.

Figure 1:
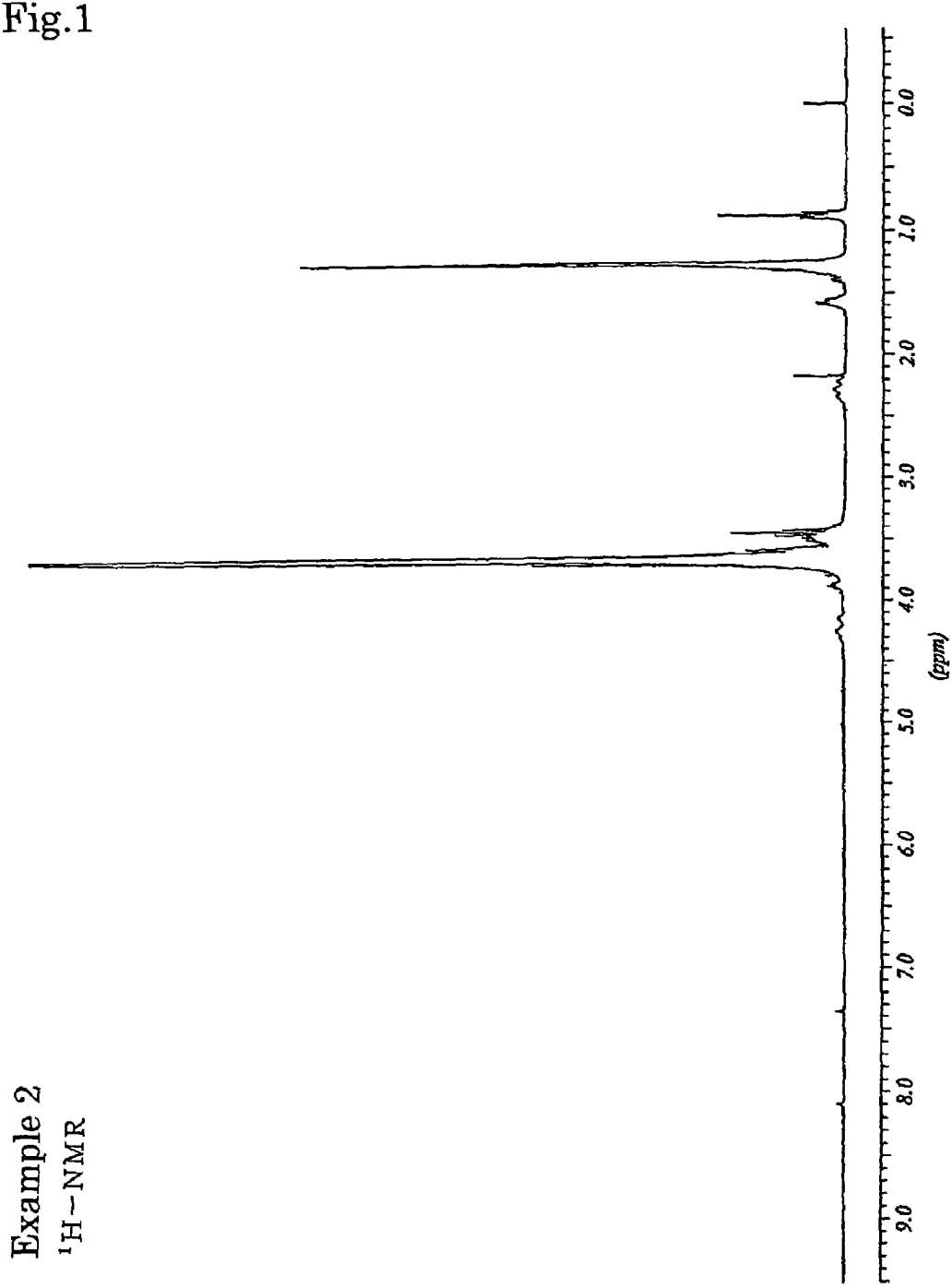
FIG. 1 shows a $^1$H-NMR spectrum of the compound obtained in Example 2.
Figure 2:
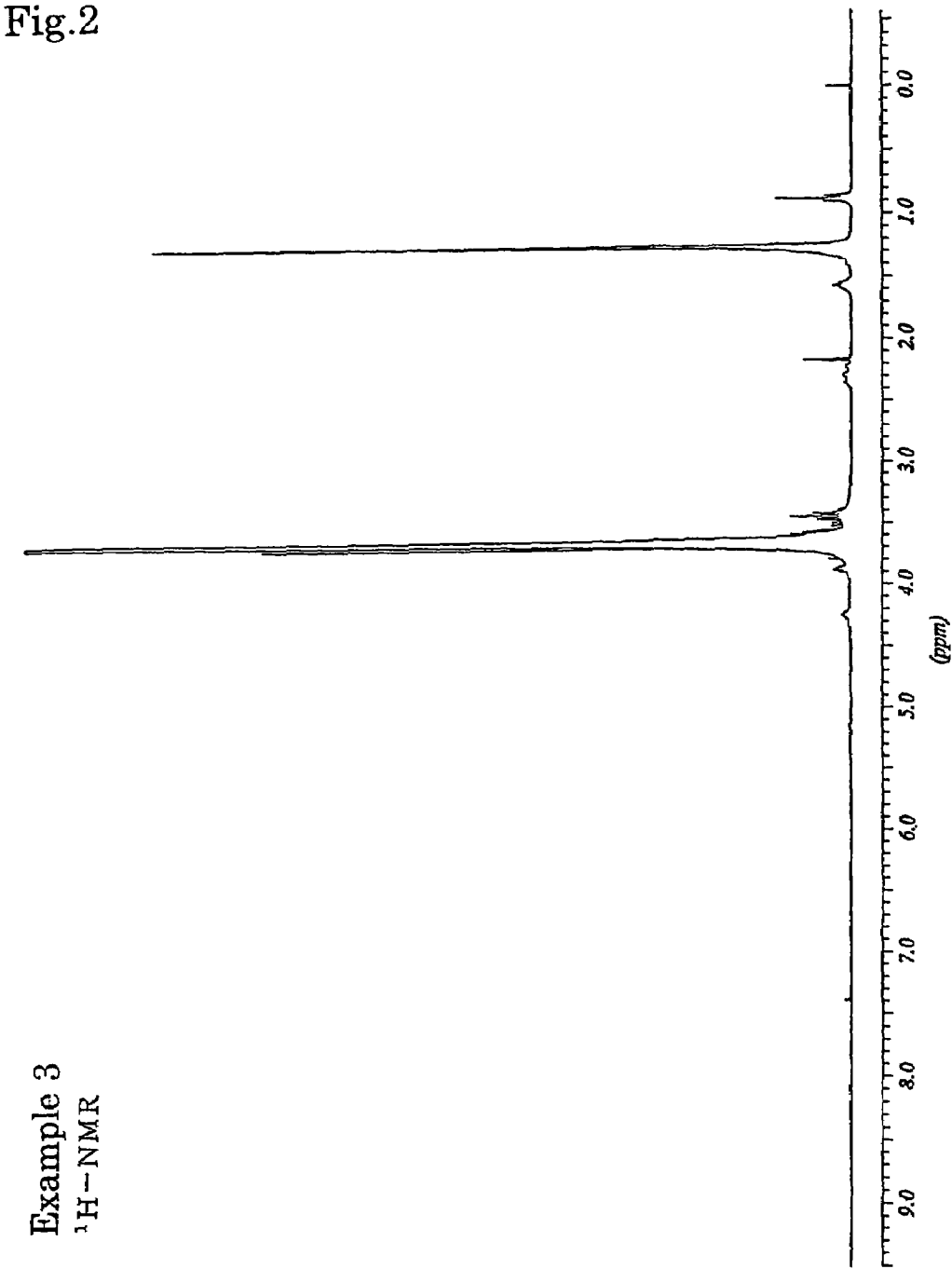
FIG. 2 shows a $^1$H-NMR spectrum of the compound obtained in Example 3.
Figure 3:
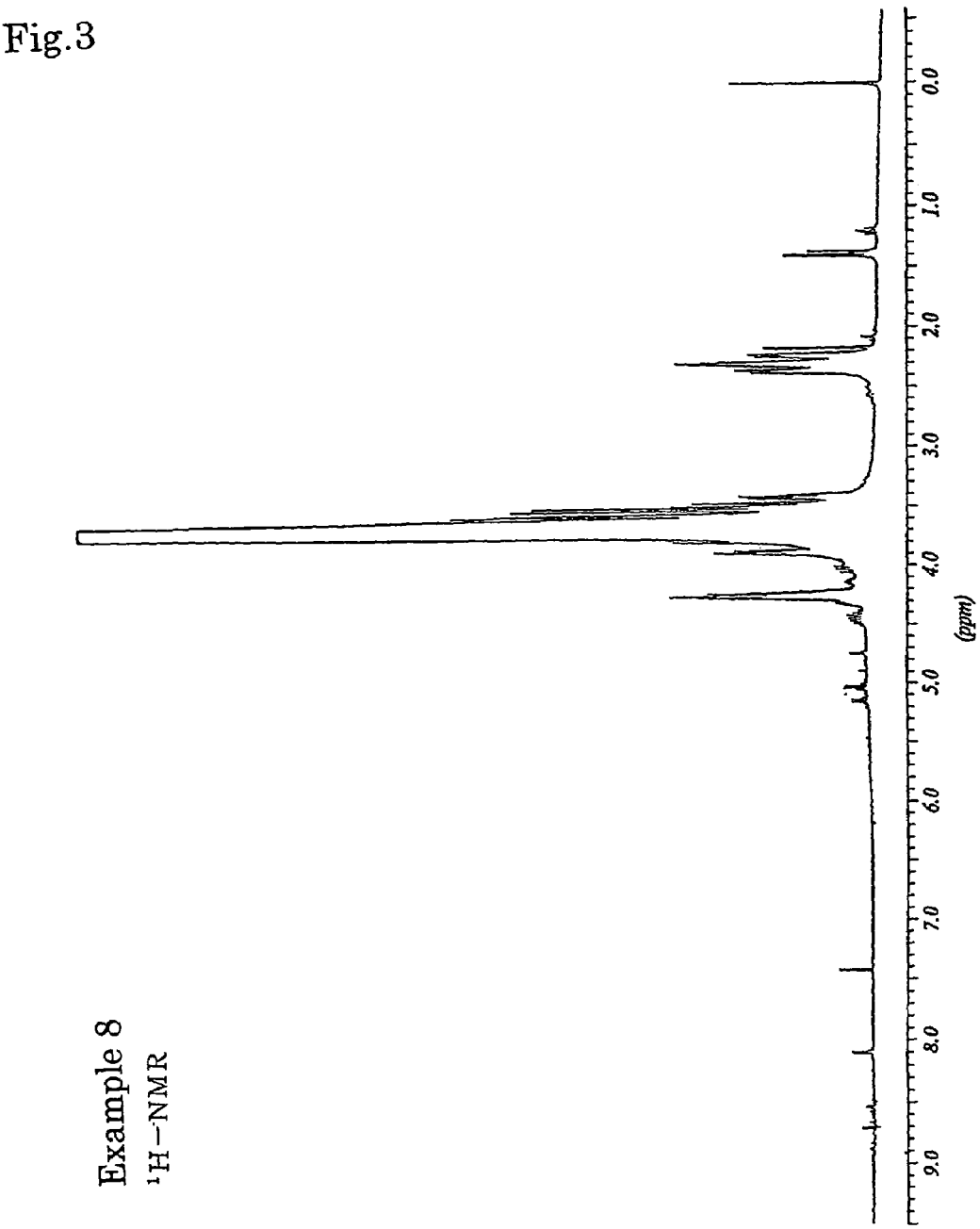
FIG. 3 shows a $^1$H-NMR spectrum of the compound obtained in Example 8.
Figure 4:
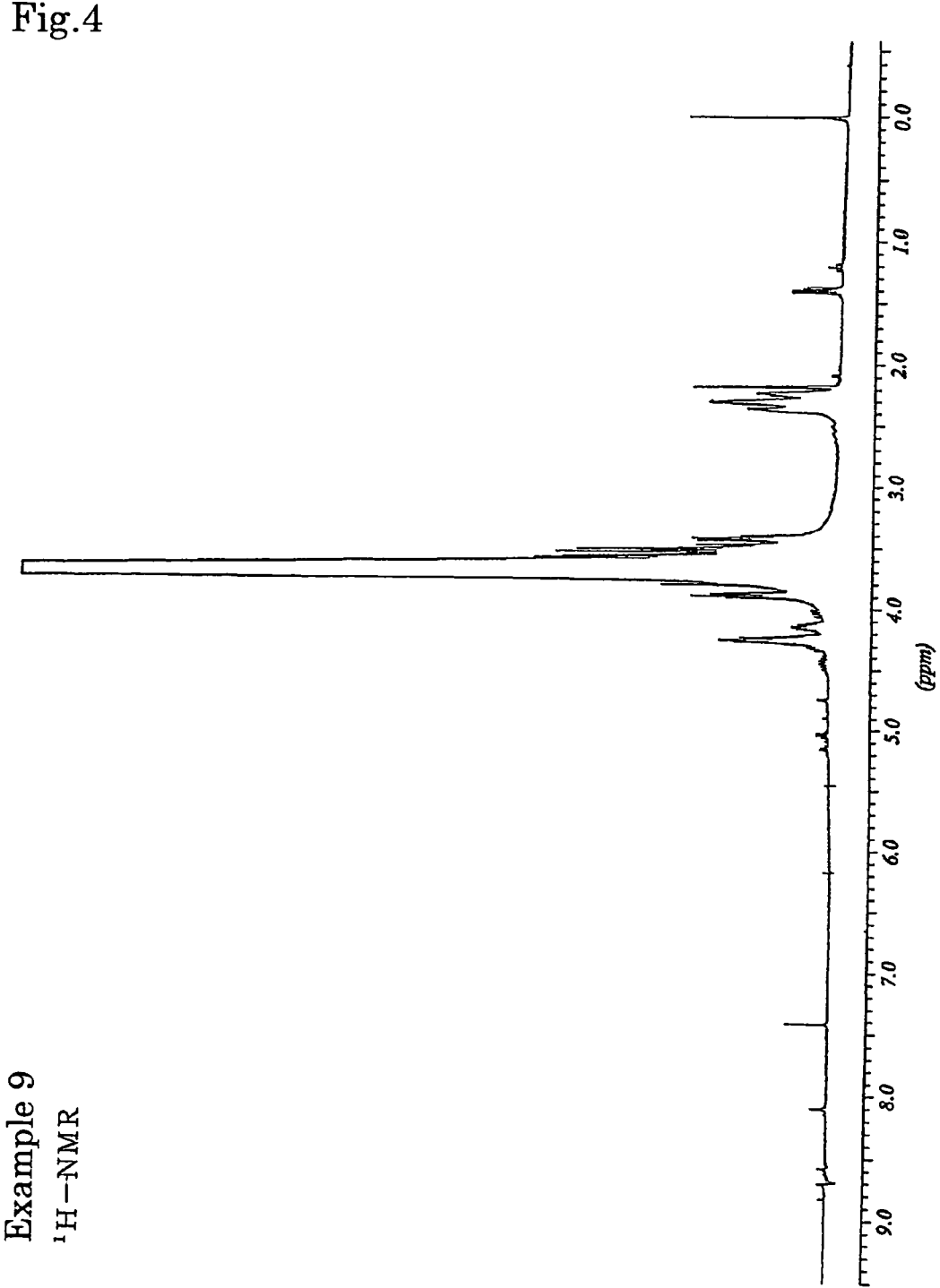
FIG. 4 shows a $^1$H-NMR spectrum of the compound obtained in Example 9.

The present invention is described below in detail.

Compound of the Present Invention

In the compound represented by formula (1), n is an integer from 2 to 6, preferably an integer from 4 to 6, and more preferably 4.

If n is 7 or more, the water solubility of the compound of formula (1) is greatly decreased, so that the compound becomes insoluble in water. To improve surface activity, n is preferably at least 2, and more preferably at least 4. In view of water solubility, biodegradability after the release of the compound into the environment, etc. as well as surface activity, n is most preferably 4.

In the compound represented by formula (1), W is a hydrogen atom or a fluorine atom, and is preferably a fluorine atom in order to reduce surface tension.

W—$C_NF_{2n}$— may be linear or branched. Examples thereof include $CF_3$—, $CF_3$—$CF_2$—, $CF_3$—$CF_2$—$CF_2$—, $CF_3$—$(CF_3)CF$—, $CF_3$—$CF_2$—$CF_2$—$CF_2$—, $CF_3$—$(CF_3)$ $CF$—$CF_2$—, $CF_3$—$CF_2$—$(CF_3)CF$—, $CF_3$—$CF_2$—$CF_2$— $CF_2$—$CF_2$—, $CF_3$—$CF_2$—$CF_2$—$CF_2$—$CF_2$—$CF_2$—, $CHF_2$—, $CHF_2$—$CF_2$—, $CHF_2$—$CF_2$—$CF_2$—, $CHF_2$— $(CF_3)CF$—, $CHF_2$—$CF_2$—$CF_2$—$CF_2$—, $CHF_2$—$(CF_3)$ $CF$—$CF_2$—, $CHF_2$—$CF_2$—$(CF_3)CF$—, $CHF_2$—$CF_2$— $CF_2$—$CF_2$—$CF_2$—, $CHF_2$—$CF_2$—$CF_2$—$CF_2$—$CF_2$— $CF_2$—, etc. Linear W—$C_nF_{2n}$— with W being a fluorine atom is preferable, and $CF_3$—$CF_2$—$CF_2$—$CF_2$— is especially preferable.

In the compound represented by formula (1), a is an integer from 15 to 50. The value of a affects the solubility of the compound of the invention in water. When the compound of the invention is used for aqueous coating compositions, aqueous ink compositions, photographic photosensitive materials, etc., a is preferably about 20 to about 45, and more preferably about 20 to about 25.

In the compound represented by formula (1), when X is —$SO_2$—N(R)—, examples of the lower alkyl group represented by R include linear and branched alkyl groups having 1 to 6 carbon atoms. Specific examples thereof include methyl, ethyl, n-propyl, isopropyl, n-butyl, isobutyl, pentyl and hexyl groups. Among such groups, methyl and ethyl groups are preferable.

In the compound represented by formula (1), when X is -M-O— or —$CH_2$O-M-O—, examples of the alkylene group represented by M include linear and branched alkylene groups having 1 to 5 carbon atoms. Specific examples thereof include —$CH_2$—, —$CH_2$—$CH_2$—, —$CH_2$—$CH_2$—$CH_2$—, —$CH_2$—$CH_2$—$CH_2$—$CH_2$—, —$CH(CH_3)$—$CH_2$—, etc. Among such groups, —$CH_2$—$CH_2$— is preferable.

Examples of the hydroxyl-substituted alkylene group represented by M include the above alkylene groups that have one or two hydroxyl groups as substituents. Specific examples thereof include —$CH_2$—$CH(OH)$—$CH_2$—, —$CH_2$—$CH_2$—$CH(OH)$—$CH_2$—, —$CH_2$—$CH_2$—$CH_2$—$CH(OH)$—$CH_2$—, etc. In view of ease of synthesis and water solubility, —$CH_2$—$CH(OH)$—$CH_2$— is preferable.

In the compound represented by formula (1), when Y is -M'-$C_mF_{2m}$—W' or -M'-$OCH_2$—$C_mF_{2m}$—W', examples of the alkylene group represented by M' include linear and branched alkylene groups having 1 to 5 carbon atoms. Specific examples thereof include —$CH_2$—, —$CH_2$—$CH_2$—, —$CH_2$—$CH_2$—$CH_2$—, —$CH_2$—$CH_2$—$CH_2$—$CH_2$—, —$CH(CH_3)$—$CH_2$—, etc. Among such groups, —$CH_2$—$CH_2$— is preferable.

Examples of the hydroxyl-substituted alkylene group represented by M' include the above alkylene groups that have one or two hydroxyl groups as substituents. Specific examples thereof include —$CH_2$—$CH(OH)$—$CH_2$—, —$CH_2$—$CH_2$—$CH(OH)$—$CH_2$—, —$CH_2$—$CH_2$—$CH_2$—$CH(OH)$—$CH_2$—, etc. In view of ease of synthesis and water solubility, —$CH_2$—$CH(OH)$—$CH_2$— is preferable.

m is an integer from 2 to 6, preferably an integer from 4 to 6, and more preferably 4. If m is 7 or more, the water solubility of the compound of formula (1) is greatly decreased, so that the compound becomes insoluble in water. To improve surface activity, m is preferably at least 2, and more preferably at least 4. In view of water solubility, biodegradability after the release of the compound into the environment, etc. as well as surface activity, m is most preferably 4.

W' is a hydrogen atom or a fluorine atom, and is preferably a fluorine atom in order to reduce surface tension.

$C_mF_{2m}$—W' may be linear or branched, and is preferably linear. Examples thereof include $CF_3$—, $CF_3$—$CF_2$—, $CF_3$—$CF_2$—$CF_2$—, $CF_3$—$(CF_3)CF$—, $CF_3$—$CF_2$—$CF_2$—$CF_2$—, $CF_3$—$(CF_3)CF$—$CF_2$—, $CF_3$—$CF_2$—$(CF_3)CF$—, $CF_3$—$CF_2$—$CF_2$—$CF_2$—$CF_2$—, $CF_3$—$CF_2$—$CF_2$—$CF_2$—$CF_2$—$CF_2$—, $CHF_2$—, $CHF_2$—$CF_2$—, $CHF_2$—$CF_2$—$CF_2$—, $CHF_2$—$(CF_3)CF$—, $CHF_2$—$CF_2$—$CF_2$—$CF_2$—, $CHF_2$—$(CF_3)CF$—$CF_2$—, $CHF_2$—$CF_2$—$(CF_3)CF$—, $CHF_2$—$CF_2$—$CF_2$—$CF_2$—$CF_2$—, $CHF_2$—$CF_2$—$CF_2$—$CF_2$—$CF_2$—$CF_2$—, etc. Linear —$C_mF_{2m}$—W' with W' being a fluorine atom is preferable, and $CF_3$—$CF_2$—$CF_2$—$CF_2$— is especially preferable.

W and W' may be the same or different, and preferably both are fluorine atoms in order to reduce surface tension.

n and m may be the same or different, and are preferably the same.

M and M' may be the same or different, and are preferably the same.

In the compound represented by formula (1), the alkyl group having 4 to 19 carbon atoms represented by Y may be linear or branched. Examples of such alkyl groups include linear and branched —$C_bH_{2b+1}$ (wherein b is an integer from 11 to 19). Preferable examples thereof are linear —$(CH_2)_bH$ (wherein b is an integer from 11 to 19). b is preferably 11 to 17, and more preferably 12 to 16.

When Y is a substituted alkyl group having 4 to 19 carbon atoms, the $C_{4-19}$ alkyl group is as described above, and examples of its substituents include chlorine, nitro, methoxy, ethoxy, etc. The $C_{4-19}$ alkyl group may be substituted with one or two substituents selected from these.

In the compound represented by formula (1), examples of the aryl group represented by Y include monocyclic, bicyclic and tricyclic aryl groups having 6 to 14 carbon atoms. Examples thereof include phenyl, naphthyl, anthryl, and phenanthryl groups. Among such groups, the phenyl group is preferable.

When Y is a substituted aryl group, examples of its substituents include methyl, ethyl, n-propyl and isopropyl groups, etc. The aryl group may be substituted with one or two groups selected from these.

In the compound represented by formula (1), examples of the acyl group represented by Y include linear and branched acyl groups having 4 to 19 carbon atoms. Specific examples of such acyl groups include butyryl, isobutyryl, valeryl, isovaleryl, pivaloyl, acryloyl, methacryloyl, lauroyl, palmitoyl, stearoyl, oleoyl, linoleyl and linolenyl groups, etc. Among such groups, the lauroyl group is preferable.

In the compound represented by formula (1), examples of the alkenyl group represented by Y include linear and branched alkenyl groups having 4 to 19 carbon atoms. Specific examples of such alkenyl groups include 17-octadecenyl, oleyl and linolyl groups, etc. Among such groups, the 17-octadecenyl group is preferable.

In the compound represented by formula (1), examples of the alkynyl group represented by Y include linear and branched $C_{1-20}$ alkynyl groups. Specific examples of such alkynyl groups include 15-hexadecynyl and 17-octadecynyl groups, etc. Among such groups, the 17-octadecynyl group is preferable.

The compound of the invention represented by formula (1) has the ratio of the molecular weight ($MW_{EO}$) of polyoxyethylene group (the moiety $(CH_2CH_2O)_a$) to the molecular weight ($MW_F$) of fluoroalkyl groups (the moieties W—$C_nF_{2n}$, and $C_mF_{2m}$—W') within the range expressed by the equation:

$$MW_{EO}/MW_F = 2.2 \text{ to } 10$$

The compound according to the present invention has high water solubility as the molecular weight ratio of the hydrophilic polyoxyethylene group to the hydrophobic fluoroalkyl groups is within the above range. The molecular weight ratio is preferably $MW_{EO}/MW_F=2.3$ to 9, and more preferably $MW_{EO}/MW_F=4$ to 9.

The molecular weight ($MW_{EO}$) of the polyoxyethylene group is that of the moiety $(CH_2CH_2O)_a$ in the compound, the value of which can be obtained by multiplying 44 (the molecular weight of the polyoxyethylene group unit —$CH_2CH_2O$—) by a. The molecular weight ($MW_F$) of the fluoroalkyl groups is the total molecular weight of the moieties W—$C_nF_{2n}$, and $C_mF_{2m}$—W'. Obviously, however, when Y is neither -M'-$C_mF_{2m}$—W' nor -M'-$OCH_2$—$C_mF_{2m}$—W', the molecular weight of $C_mF_{2m}$—W' is not included in the molecular weight ($MW_F$) of the fluoroalkyl groups.

The compound of the invention represented by formula (1) has an HLB value of 10 to 16, and preferably about 12 to about 16, according to Griffin's equation for calculating HLB value. A compound having an HLB value of about 10 or more is suitable for providing excellent water solubility. A compound having an HLB value of not more than about 16 is suitable for maintaining its properties as a surfactant. The HLB value in the present invention is determined based on the equation proposed by Griffin, wherein the HLB value is obtained by multiplying the molecular weight ratio of oxyethylene groups to the whole compound by 20. To determine HLB values, various methods have been proposed in which the hydrophile-lypophile balance (HLB) of fluorine-containing surfactants is obtained, as in the method using an organic-inorganic conception diagram. In the present invention, the oxyethylene groups are simply regarded as the hydrophilic portion, and the HLB value is determined based on the molecular weight ratio of the hydrophilic portion to the whole compound. That is, the HLB value is defined by the following equation:

Griffin's HLB=[the molecular weight of the hydrophilic portion ($—(CH_2CH_2O)_a—$ in formula (1))/the molecular weight of the whole compound]×20

A preferable compound of formula (1) in the present invention is the compound represented by formula (1)':

$$C_nF_{2n+1}—CH_2CH(OH)CH_2—O—(CH_2CH_2O)_a—Y' \qquad (1)'$$

wherein Y' is $—C_bH_{2b+1}$ (wherein b is an integer from 11 to 19) or $—CH_2CH(OH)CH_2—C_mF_{2m+1}$ (wherein m is an integer from 2 to 6); and n and a are as defined above.

In the compound represented by formula (1)', when Y' is $—C_bH_{2b+1}$ (wherein b is an integer from 11 to 19), Y' may be linear or branched. Preferably Y' is linear $—(CH_2)_bH$ (wherein b is an integer from 11 to 19). b is preferably 11 to 17, and more preferably 12 to 16.

In the compound represented by formula (1)', when Y' is $—CH_2CH(OH)CH_2—C_mF_{2m+1}$, m is an integer from 2 to 6, preferably 4 to 6, and more preferably 4. If m is 7 or more, the water solubility of the compound of formula (1)' is greatly decreased, so that the compound becomes insoluble in water. To improve surface activity, m is preferably at least 2, and more preferably at least 4. In view of water solubility, biodegradability after the release of the compound into the environment, etc. as well as surface activity, m is most preferably 4.

$C_mF_{2m+1}$ may be linear or branched. Examples thereof include $CF_3—$, $CF_3—CF_2—$, $CF_3—CF_2—CF_2—$, $CF_3—(CF_3)CF—$, $CF_3—CF_2—CF_2—CF_2—$, $CF_3—(CF_3)CF—CF_2—$, $CF_3—CF_2—(CF_3)CF—$, $CF_3—CF_2—CF_2—CF_2—CF_2—$, $CF_3—CF_2—CF_2—CF_2—CF_2—CF_2—$, etc. A linear $C_mF_{2m+1}$ moiety is preferable, and $CF_3CF_2CF_2CF_2—$ is especially preferable.

As described above, Y' represents $—C_bH_{2b+1}$ or $—CH_2CH(OH)CH_2—C_mF_{2m+1}$. In view of static surface tension, Y' is preferably $—CH_2CH(OH)CH_2—C_mF_{2m+1}$, which is highly capable of reducing surface tension. In view of dynamic surface tension, both $—C_bH_{2b+1}$ and $—CH_2CH(OH)CH_2—C_mF_{2m+1}$ are highly capable of reducing surface tension, with little difference between them. $—C_bH_{2b+1}$ may be preferable because when Y' is $—C_bH_{2b+1}$, it is more capable of reducing surface tension in some cases.

As with the compound represented by formula (1), the compound represented by formula (1)' has the ratio of the molecular weight ($MW_{EO}$) of polyoxyethylene group (the moiety $(CH_2CH_2O)_a$) to the molecular weight ($MW_F$) of fluoroalkyl groups (the moieties $C_nF_{2n+1}$ and $C_mF_{2m+1}$) within the range expressed by the equation:

$MW_{EO}/MW_F$=2.2 to 10

The molecular weight ratio is preferably $MW_{EO}/MW_F$=2.3 to 9, and more preferably $MW_{EO}/MW_F$=4 to 9.

As in the case of the compound of formula (1), the compound represented by formula (1)' in the invention has an HLB value of 10 to 16, and preferably about 12 to about 16.

Examples of compounds of the present invention include:
$C_4F_9—COO—(CH_2CH_2O)_{23}—C_{12}H_{25}$,
$C_4F_9—SO_2N(CH_3)—(CH_2CH_2O)_{21}—C_{12}H_{25}$,
$C_4F_9—CH_2CH_2O—(CH_2CH_2O)_{25}—C_{12}H_{25}$
$H(CF_2)_4—CH_2OCH_2CH(OH)CH_2O—(CH_2CH_2O)_{21}—C_{14}H_{29}$,
$C_4F_9—CH_2CH(OH)CH_2O—(CH_2CH_2O)_{21}—C_{12}H_{25}$,
$C_4F_9—CH_2CH(OH)CH_2O—(CH_2CH_2O)_{25}—C_{12}H_{25}$,
$C_4F_9—CH_2CH(OH)CH_2O—(CH_2CH_2O)_{30}—C_{12}H_{25}$,
$C_4F_9—CH_2CH(OH)CH_2O—(CH_2CH_2O)_{20}—C_{14}H_{29}$,
$C_4F_9—CH_2CH(OH)CH_2O—(CH_2CH_2O)_{30}—C_{14}H_{29}$,
$C_4F_9—CH_2CH(OH)CH_2O—(CH_2CH_2O)_{23}—C_{16}H_{33}$,
$C_4F_9—CH_2CH(OH)CH_2O—(CH_2CH_2O)_{20}—C_{16}H_{33}$,
$C_4F_9—CH_2CH(OH)CH_2O—(CH_2CH_2O)_{25}—C_{16}H_{33}$,
$C_4F_9—CH_2CH(OH)CH_2O—(CH_2CH_2O)_{30}—C_{16}H_{33}$,
$C_4F_9—CH_2CH(OH)CH_2O—(CH_2CH_2O)_{40}—C_{16}H_{33}$,
$C_4F_9—CH_2CH(OH)CH_2O—(CH_2CH_2O)_{20}—C_{18}H_{37}$,
$C_4F_9—CH_2CH(OH)CH_2O—(CH_2CH_2O)_{30}—C_{18}H_{37}$,
$C_4F_9—CH_2CH(OH)CH_2O—(CH_2CH_2O)_{40}—C_{18}H_{37}$,
$C_4F_9—CH_2CH(OH)CH_2O—(CH_2CH_2O)_{23}—CH_2CH(OH)CH_2—C_4F_9$,
$C_4F_9—CH_2CH(OH)CH_2O—(CH_2CH_2O)_{35}—CH_2CH(OH)CH_2—C_4F_9$,
$C_4F_9—CH_2CH(OH)CH_2O—(CH_2CH_2O)_{45}—CH_2CH(OH)CH_2—C_4F_9$, etc.

Of these, preferable examples are:
$C_4F_9—CH_2CH(OH)CH_2O—(CH_2CH_2O)_{23}—C_{16}H_{33}$,
$C_4F_9—CH_2CH(OH)CH_2O—(CH_2CH_2O)_{40}—C_{16}H_{33}$,
$C_4F_9—CH_2CH(OH)CH_2O—(CH_2CH_2O)_{21}—C_{12}H_{25}$,
$C_4F_9—CH_2CH(OH)CH_2O—(CH_2CH_2O)_{25}—C_{12}H_{25}$,
$C_4F_9—CH_2CH(OH)CH_2O—(CH_2CH_2O)_{23}—CH_2CH(OH)CH_2—C_4F_9$,
$C_4F_9—CH_2CH(OH)CH_2O—(CH_2CH_2O)_{35}—CH_2CH(OH)CH_2—C_4F_9$, and
$C_4F_9—CH_2CH(OH)CH_2O—(CH_2CH_2O)_{45}—CH_2CH(OH)CH_2—C_4F_9$.

Especially preferable examples are:
$C_4F_9—CH_2CH(OH)CH_2O—(CH_2CH_2O)_{21}—C_{12}H_{25}$ and
$C_4F_9—CH_2CH(OH)CH_2O—(CH_2CH_2O)_{25}—C_{12}H_{25}$.

Process for Preparing the Compound of the Present Invention

Next, the process for preparing compound (1) is described below.

(A) Compound Wherein X is -M-O— (Wherein M is a Hydroxyl-Substituted Alkylene Group)

(A-1) As a preparation example of a compound wherein X is -M-O— (wherein M is a hydroxyl-substituted alkylene group), the compound represented by formula (1a):

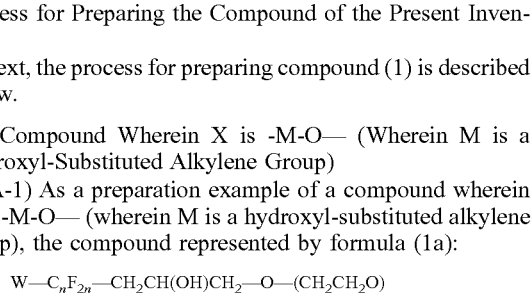

(1a)

wherein each symbol is as defined previously, can be obtained by reacting a polyoxyethylene compound represented by formula (4):

$$HO—(CH_2CH_2O)_a—Y \qquad (4)$$

wherein each symbol is as defined previously, with a glycidyl compound represented by formula (2):

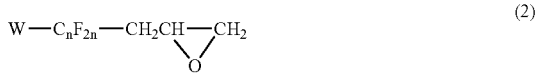

wherein each symbol is as defined previously.

The above starting materials are used in a proportion of about 1 to about 1.5 mol of glycidyl compound (2) per one mol of polyoxyethylene compound (4).

The above-mentioned reaction can be conducted by, for example, dissolving a polyoxyethylene compound (4) in a reaction vessel, adding thereto a glycidyl compound (2), and maintaining the reaction temperature in the range of about 20° C. to about 120° C., with stirring if necessary.

The reaction is usually performed in the presence of a catalyst such as $BF_3$, $SnCl_4$ or like Lewis acid; Na, K, $(CH_3)_3N$ or like alkali; etc. Although the amount of catalyst to be used is not limited, it is usually about 0.001 to about 1 mol per one mol of polyoxyethylene compound (4).

The reaction may be performed in the absence of solvent or may be performed in the presence of solvent (such as $CH_2Cl_2$, $CHCl_3$ and like halogen-containing solvents). When solvent is used, the amount thereof is usually about 500 to about 10000 ml per one mol of polyoxyethylene compound (4).

(A-2) The compound of formula (1a) wherein Y is —$CH_2CH(OH)CH_2$—$C_mF_{2m}$—W' (wherein each symbol is as defined previously), namely the compound represented by formula (1b):

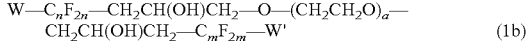

wherein each symbol is as defined previously, can be obtained by, for example, reacting a polyethylene glycol represented by formula (5):

wherein a is as defined previously, a glycidyl compound represented by formula (2):

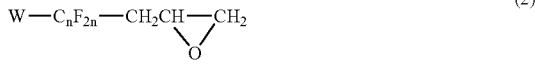

wherein each symbol is as defined previously, and a glycidyl compound represented by formula (3):

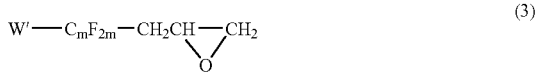

wherein each symbol is as defined previously. When W and W' represent the same atom, and n and m the same integer, the glycidyl compounds of formulae (2) and (3) are the same compound.

The above starting materials are usually used in a proportion of about 1 to about 1.5 mol of glycidyl compound (2) and 1 to about 1.5 mol of glycidyl compound (3) per one mol of polyethylene glycol.

The above-mentioned reaction can be conducted by, for example, dissolving a polyethylene glycol in a reaction vessel, adding thereto a glycidyl compound (2) and a glycidyl compound (3), and maintaining the reaction temperature in the range of about 20° C. to about 120° C., with stirring if necessary.

The reaction is usually performed in the presence of a catalyst such as $BF_3$, $SnCl_4$ or like Lewis acid; Na, K, $(CH_3)_3N$ or like alkali; etc. Although the amount of catalyst to be used is not limited, it is usually about 0.001 to about 1 mol per mol of polyethylene glycol.

The reaction may be performed in the absence of solvent or may be performed in the presence of solvent (such as $CH_2Cl_2$, $CHCl_3$, and like halogen-containing solvents). When solvent is used, the amount thereof is usually about 500 to about 10000 ml per one mol of polyethylene glycol.

The compound of formula (1a), i.e. the reaction product, can be easily isolated and purified by known separation and purification methods such as column chromatography.

The compound of the invention represented by formula (1a) has high water solubility and excellent surface activity, so that the compound is highly capable of reducing surface tension when it is added to an aqueous solution, etc.

(B) Compound Wherein X is —$CH_2$-O-M-O— (Wherein M is a Hydroxyl-Substituted Alkylene Group)

As a preparation example of a compound wherein X is —$CH_2$O-M-O— (wherein M is a hydroxyl-substituted alkylene group), the compound represented by formula (1c):

wherein each symbol is as defined previously, can be prepared by the same procedure as in (A-1), except that a glycidyl compound represented by formula (6):

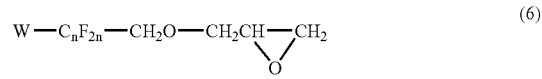

wherein each symbol is as defined previously, is used in place of the glycidyl compound (2) of (A-1).

(C) Compound Wherein X is -M-O— or —$CH_2$O-M-O— (Wherein M is an Alkylene Group)

The compound wherein X is -M-O— or —$CH_2$O-M-O— (wherein M is an alkylene group) can be prepared, for example, according to the method disclosed in International Publication No. WO00/61686.

(D) Compound Wherein X is —COO—

The compound represented by formula (1d):

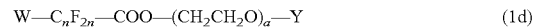

wherein each symbol is as defined previously, can be obtained by reacting a polyoxyethylene compound represented by formula (4):

wherein each symbol is as defined previously, with a fluorinated carboxylic acid compound represented by formula (7):

wherein each symbol is as defined previously.

Specifically, the compound of formula (1d) can be prepared by, for example, reacting a polyoxyethylene compound (4) with a fluorinated carboxylic acid compound (7) in the presence of an acid catalyst (such as sulfuric acid or p-toluenesulfonic acid). Alternatively, the compound of formula (1d) can be prepared by conducting a condensation reaction between the compound (4) and the compound (7) in the presence of a known condensing agent (such as dicyclohexylcarbodiimide or carbonyldiimidazole). In these methods, those skilled in the art can determine reaction conditions according to their purpose.

(E) Compound Wherein X is —$SO_2$—N(R)—

The compound wherein X is —$SO_2$—N(R)— (wherein R is as defined previously) can be prepared, for example, according to the method disclosed in U.S. Pat. No. 2,915,554.

The above compounds used as the starting materials are known or can be easily produced by those having ordinary skill in the art, and they can be synthesized according to known methods.

Determination of the Surface Tension and Water Solubility of the Compound of the Present Invention The compound of the present invention is excellent in terms of both static surface tension and dynamic surface tension. For example, when a 0.1 wt. % aqueous solution of such a compound is prepared and left for one day, the static surface tension determined by the Wilhelmy method at 25° C. is about 18 to about 34 mN/m, and preferably about 18 to about 31 mN/m. After a 0.5 wt. % aqueous solution of the compound is prepared, the dynamic surface tension measured by the maximum bubble pressure method at 25° C. is about 30 to about 50 mN/m, and preferably about 30 to about 45 mN/m at 100 milliseconds. The reduction of dynamic surface tension means the reduction of surface tension of an interface that is always fluctuating, therefore leading to improved leveling properties, permeability, wettability on the surface of solids in such a state, etc.

Moreover, although the compound of the invention has a fluoroalkyl group in its molecule, it is easily soluble in water. The compound, therefore, can be dissolved in water as is, without being dissolved in an organic solvent or being used in combination with other surfactants. The pH of such an aqueous solution may be in the acidic range or in the alkaline range, and the water may be hard water.

Because of its high water solubility, the compound of the invention can be used to make a concentrated aqueous solution. For example, the aqueous solution can be adjusted to such a concentration that it contains about 30% to about 60% by weight, and preferably about 50% to about 60% by weight, of the compound of the invention. The compound of the invention can be distributed in the state of a concentrated aqueous solution, thus providing a high degree of safety and ease of treatment. The aqueous solution may further contain one or more organic solvents that are miscible with water in any proportion, such as methanol, ethanol, etc. However, the proportion of organic solvent in the aqueous solution is preferably about 30% or less by weight.

Uses of the Compound of the Present Invention

The compound of the present invention can be used as a surfactant, and particularly as a fluorine-containing water-soluble nonionic surfactant.

Specifically, the compound of the present invention can be used as an additive to modify solutions such as coating materials, ink, photographic emulsions, etc., thus improving leveling properties, permeability, wettability on the surface of solids, etc. The compound of the invention can also be used as a surface treatment agent, internal additive, etc. to provide the surface of solids such as fibers, films or powders with antifouling properties, water repellency and oil repellency, lubricity, antistatic properties, adhesive properties, and releasability.

For example, the compound of the invention can be used as a modifying agent for coating defects, protective agents for coating films, surface tension-reducing agents for inks, surface treatment agents for pigments, pigment dispersants, etc. in the pigment industry, coating material industry, and ink industry. The compound of the invention can also be used as a penetrant for textile processing, textile oil agent, water- and oil-repellent agent for textiles, stainproofing agent for textiles, oil-repellent agent for paper, etc. in the paper industry and textile industry. The compound of the invention can also be used as an antifoaming agent, internal additive for plastics, internal additive for rubber, auxiliary agent for urethane wet film formation, mold release agent for urethane, anticlouding agent for plastic films, etc. in the plastics industry and rubber industry.

In addition, the compound of the invention can be used in various industrial fields as a detergent, floor wax remover, wax leveling agent, spot inhibitor for electroplating, antifoaming agent for aqueous solution, photographic emulsion, internal additive for vinyl films as an antifogging agent for agricultural vinyl greenhouses, flux inhibitor for soldering, water- and oil-repellent agent for leathers, stainproofing agent for leathers, inhibitor of uneven film formation in spin coating, additives for adhesives, rust inhibitor for metal surfaces, etc. The compound of the invention is thus extremely useful.

Such compositions comprising the compound of the invention may contain organic solvents that can be mixed with water in any proportion, additives, etc., depending on the usage of the composition. The concentration of the compound of the invention in such a composition can be suitably adjusted according to the type of composition. The concentration thereof is usually about 0.001% to about 10% by weight, preferably about 0.01% to about 5% by weight, and more preferably about 0.01% to about 1% by weight.

When the compound of the invention is added to an aqueous solution or other composition, one or more compounds selected from the group consisting of the compounds represented by formula (1) may be used depending on the purpose.

The present invention includes aqueous coating compositions, aqueous ink compositions, and photographic photosensitive materials, etc. that contain the compound of formula (1).

The aqueous coating composition of the invention may contain the compound of the invention, solvents such as water, water-soluble or water-dispersible resins such as water-soluble acrylic resins and water-dispersible fluorine-containing resins, and additionally, other components that are generally present in aqueous coating compositions, such as pigments (e.g. titanium dioxide, calcium carbonate, barium carbonate, kaolin, carbon black, colcothar, cyanine blue, etc.), plasticizers, dispersants, thickeners, antifoaming agents, preservatives, mildewproofing agents, antisettling agents, leveling agents, ultraviolet absorbers, etc. according to the type of coating composition.

The aqueous coating composition can be prepared by mixing such components in suitable amounts using a known method.

The aqueous coating composition of the invention can be applied to plastics, metals, inorganic materials, etc. by known methods, using a brush, roller, air spray, airless spray, flow coater, roll coater, etc. The aqueous coating composition of the invention can be used in various fields for cars, the exteriors and interiors of buildings, wood products, etc.

The aqueous ink composition of the invention may contain the compound of the invention, solvents such as water, coloring agents (such as titanium oxides, carbon black, etc.), and additionally, other additives that are generally present in aqueous ink compositions, including dispersants (such as water-soluble acrylic resins, water-soluble styrene-acrylic resins, and like water soluble resins), viscosity modifiers (such as xanthan gum and like natural polysaccharides, hydroxyethyl cellulose and like semisynthetic cellulose polymers, polyvinyl pyrrolidone and like water-soluble synthetic polymers, etc.), wetting agents (such as propylene glycol, glycerin, etc.), antifoaming agents, coagulation inhibitors, pH adjusters, rust inhibitors, preservatives, mildewproofing agents, etc., depending on the usage of the composition.

The aqueous ink composition can be prepared by mixing such components in suitable amounts using a known method.

The aqueous ink composition of the present invention can be suitably used as an ink for recording use, such as an ink for writing instruments, printing ink, ink for ink-jet printers, etc. The aqueous ink composition can be applied to copying paper, colored paper, or other materials.

The photographic photosensitive material of the present invention may comprise a base, an emulsion layer, an overcoat layer, a protective layer, a back layer and other functional layers, etc. The use of the compound of the invention in at least one of these layers serves to prevent electrification, to improve coating characteristics, and to prevent adhesion, fogging, and staining, etc., thus providing a photographic photosensitive material with excellent photographic characteristics.

The photographic photosensitive material of the invention may be, for example, one that has at least an emulsion layer and a protective layer on the base and that contains the compound of the invention in at least one of the base, emulsion layer and protective layer, etc.

Examples of the base in the photographic photosensitive material of the invention include a base that is composed of a polymer film of polyolefin such as polyethylene, polystyrene, cellulose derivative such as cellulose acetate, polyethylene terephthalate, etc. or that is composed of a sheet of baryta paper, synthetic paper, paper, etc. coated on both sides with the polymer film; and the like. The thickness of the base is usually about 50 to about 400 µm, and preferably about 100 to about 200 µm. The base may further have an antihalation layer.

The emulsion layer and the protective layer of the photographic photosensitive material of the invention can be formed according to known methods, using compositions suitably selected from the following. Usable compositions are those that are generally used in photographic photosensitive materials, including binders for layers comprising photographic photosensitive materials (such as gelatin, casein, carboxymethylcellulose, hydroxyethylcellulose, agar, sodium alginate, starch derivatives, polyvinyl alcohol, dextran, poly-N-vinyl pyrrolidone, polyacrylic acid derivatives, polyacrylamide and the like; derivatives thereof and hydrolysates thereof; etc.), antistatic agents (such as hydrophilic surfactants, hygroscopic substances, water-soluble inorganic salts, some kinds of polymers, etc.), surface protective agents, auxiliary agents for coating, stainproofing agents for treatment at the time of development, lubricating compositions, etc. In addition, other known additives can be used depending on their use, examples thereof being surfactants, storage stabilizers, preservatives, mildewproofing agents, etc., which can be used for emulsification or dispersion; sensitization; prevention of fogging, static marks and adhesion; improvement of other photographic characteristics; reduction of electrification; etc.

In the emulsion layer, surface protective layer, etc. of the photographic photosensitive material of the invention, there is no restriction on the kind, preparation method, and chemical sensitization method of silver halide; on usable antifogging agents, stabilizers, hardeners, plasticizers, lubricants, auxiliary agents for coating, matting agents, brightening agents, spectral sensitization coloring matter, dyes, color couplers, etc.; nor on the materials (rubber, Delrin, nylon, etc.) that come into contact with the photographic photosensitive material at the time of development.

The thickness of the emulsion layer according to the invention may usually be about 0.5 to about 20 µm, and preferably about 1 to about 10 µm. The thickness of the protective layer according to the invention may usually be about 0.1 to about 10 µm, and preferably about 0.5 to about 5 µm.

The amount of the compound of the invention in the photographic photosensitive material is about 0.1 to about 2000 mg/m$^2$, and preferably about 1 to about 200 mg/m$^2$. The compounds of the invention may be used in combination of two or more.

The photographic photosensitive material of the invention can be prepared by mixing the compound of the invention with other components in suitable amounts according to a known method, applying the mixture to the base in one or more layers to form an emulsion layer, a protective layer, etc., and drying. The photographic photosensitive material can also be prepared by incorporating suitable amounts of the components including the compound of the invention into the base itself, further applying the above mixture to the base to form an emulsion layer, a protective layer, etc., and drying. Application methods include dip coating, air knife coating, spray coating, extrusion coating, simultaneous multi-layer coating (slide hopper coating, curtain coating, etc.). A method of immersing the base in an antistatic liquid containing the compound of the invention may also be used.

The total amount of binder in the silver halide emulsion layer, protective layer, etc. on one side of the base is preferably about 0.5 to about 3.5 g/m$^2$, and more preferably about 1.0 to about 3.0 g/m$^2$.

In the processes of production, photographing, development, etc., where winding, rewinding or the like is conducted, the photographic photosensitive materials of the invention are often subjected to contact friction against a roller and to close contact with and separation from each other. However, when the processes are conducted under appropriate conditions, the photographic photosensitive material of the invention can be produced with various excellent photographic properties. Materials for rollers include rubber, metal, plastics (such as Delrin and nylon), etc., and any such materials can be used without limitation.

The photographic photosensitive material of the present invention may be used for ordinary silver halide monochrome photosensitive materials, ordinary multilayer color photosensitive materials, etc. Specifically, preferable examples thereof include photosensitive materials such as photographic sensitive materials, X-ray sensitive materials, printing sensitive materials, color reversal films, color negative films, color positive films, etc. In particular, the photographic photosensitive material of the invention can be suitably used as a silver halide photosensitive material for high-speed processing, and a silver halide photosensitive material with high sensitivity.

BEST MODE FOR CARRYING OUT THE INVENTION

The present invention is described with reference to the following examples. However, the invention is not limited thereto.

EXAMPLE 1

250.8 g (0.2 mol) of polyoxyethylene alkyl ether [HO—$(CH_2CH_2O)_a$—$(CH_2)_b$—H (a=23, b=16)] that had been melted at 60° C. was weighed out and placed into a 500 ml four-necked round-bottomed flask equipped with a cooling tube, a thermometer and a dropping funnel, and was then stirred with a stirrer (at 300 rpm) at 75° C. while 1.0 g (0.0071 mol) of $BF_3 \cdot Et_2O$ was added thereto. The glycidyl compound represented by the following formula:

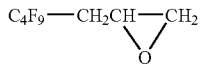

was added dropwise in an amount of 55.2 g (0.2 mol) in the absence of a solvent over 2 hours. One portion of the reaction liquid was picked up and dissolved in an equivalent weight of acetone, and the reaction was monitored by gas chromatography on the basis of the acetone peak area.

The NMR spectral data confirmed that the compound shown in Table 1 was obtained.

EXAMPLES 2 to 6 and COMPARATIVE EXAMPLES 1 to 3

As shown in Table 1, the compounds of Examples 2 to 6 and Comparative Examples 1 to 3 and 5 were prepared following the procedure of Example 1, except that the polyoxyethylene alkyl ethers (0.2 mol) were used in which a and b represent the numbers required for each compound.

The NMR spectral data confirmed that the compounds shown in Table 1 were obtained.

COMPARATIVE EXAMPLES 5

The compound of Comparative Example 5 in Table 1 was prepared following the procedure of Example 1, except that the polyoxyethylene alkyl ether (0.2 mol) was used in which a was 20 and b was 18, and that the glycidyl compound (0.2 mol) represented by the following formula:

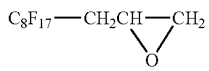

was used.

The NMR spectral data confirmed that the compound shown in Table 1 was obtained.

EXAMPLE 7

200.0 g (0.2 mol) of polyethylene glycol [HO—$(CH_2CH_2O)_a$—H (a=23)] that had been melted at 60° C. was weighed out and placed into a 500 ml four-necked round-bottomed flask equipped with a cooling tube, a thermometer and a dropping funnel, and was then stirred with a stirrer (at 300 rpm) at 75° C. while 1.0 g (0.0071 mol) of $BF_3 \cdot Et_2O$ was added thereto. The glycidyl compound represented by the following formula:

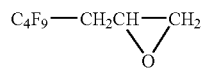

was added dropwise in an amount of 110.4 g (0.4 mol) in the absence of a solvent over 2 hours. One portion of the reaction liquid was picked up and dissolved in an equivalent weight of acetone, and the reaction was monitored by gas chromatography on the basis of the acetone peak area.

The NMR spectral data confirmed that the compound shown in Table 1 was obtained.

EXAMPLES 8 AND 9 AND COMPARATIVE EXAMPLES 4

The compounds of Examples 8 and 9, and Comparative Example 4 in Table 1 were prepared following the procedure of Example 7, except that the polyethylene glycols [HO—$(CH_2CH_2O)$a-H] (0.2 mol) were used in which a was 35, 45 and 9 respectively.

The NMR spectral data confirmed that the compounds shown in Table 1 were obtained.

COMPARATIVE EXAMPLES 6 TO 9

The compounds of Comparative Examples 6 and 7 in Table 1 were prepared following the procedure of Example 1, except that "Uniox M-400" and "Uniox M-1000" (products of NOF Corporation) were respectively used in place of the polyoxyethylene alkyl ether; the compound of Comparative Example 8 was prepared using "NIKKOL BC-15" (product of Nikko Chemicals Co., Ltd.); and the compound of Comparative Example 9 was prepared using "IONET DO-1000" (product of Sanyo Chemical Industries, Ltd.).

TEST EXAMPLES

The compounds of Examples 1 to 9 and Comparative Examples 1 to 7 were tested by the following method to evaluate their water solubility and capability for reducing surface tension.

For the evaluation of water solubility, a uniform liquid was used that was obtained by heating each compound at about 60° C. 5 g aqueous mixtures were prepared at predetermined concentrations (1 wt. %, 5 wt. % and 50 wt. %) in capped sample bottles. After the aqueous mixtures were heated if necessary, and shaken by hand for stirring, they were observed with the naked eye to confirm the water solubility of the compound at 25° C.

For the measurement of surface tension, a uniform liquid was used that was obtained by heating each compound at about 60° C. The compounds were each dissolved in water to prepare 10 g of 0.1 wt. % aqueous solutions. After the aqueous solutions were left to stand for 1 day, the static surface tension thereof was measured at 25° C. according to the Wilhelmy method (plate method). The measurement instrument used was a "SURFACE TENSIOMETER CBVP-A3" (product of Kyowa Interface Science Co., Ltd.).

For the measurement of dynamic surface tension, each compound was dissolved in water, heated if necessary, to prepare 80 g of 0.5 wt. % aqueous solutions. The dynamic surface tension thereof was measured at 25° C. according to the maximum bubble pressure method. The obtained value was that measured at 100 milliseconds. The measurement instrument used was a "KRUSS BUBBLE PRESSURE TENSIOMETER-BP2".

TABLE 1

| | Compound | Molecular Weight $MW_{EO}$ | Molecular Weight $MW_F$ | $MW_{EO}/MW_F$ | HLB Griffin | Water Solubility 1% |
|---|---|---|---|---|---|---|
| Example | | | | | | |
| 1 | C4F9—CH2CH(OH)CH2O—(CH2CH2O)23—C16H33 | 1012 | 219 | 4.62 | 13.2 | Dissolved |
| 2 | C4F9—CH2CH(OH)CH2O—(CH2CH2O)25—C16H33 | 1100 | 219 | 5.02 | 13.6 | Dissolved |
| 3 | C4F9—CH2CH(OH)CH2O—(CH2CH2O)40—C16H33 | 1760 | 219 | 8.04 | 15.5 | Dissolved |
| 4 | C4F9—CH2CH(OH)CH2O—(CH2CH2O)20—C18H37 | 660 | 219 | 4.01 | 12.3 | Dissolved |
| 5 | C4F9—CH2CH(OH)CH2O—(CH2CH2O)21—C12H25 | 924 | 219 | 4.22 | 13.3 | Dissolved |
| 6 | C4F9—CH2CH(OH)CH2O—(CH2CH2O)25—C12H25 | 1100 | 219 | 5.02 | 14.1 | Dissolved |
| 7 | C4F9—CH2CH(OH)CH2O—(CH2CH2O)23—CH2CH(OH)CH2—C4F9 | 1012 | 438 | 2.31 | 12.7 | Dissolved |
| 8 | C4F9—CH2CH(OH)CH2O—(CH2CH2O)35—CH2CH(OH)CH2—C4F9 | 1540 | 438 | 3.52 | 14.5 | Dissolved |
| 9 | C4F9—CH2CH(OH)CH2O—(CH2CH2O)45—CH2CH(OH)CH2—C4F9 | 1980 | 438 | 4.52 | 15.4 | Dissolved |
| Comparative Example | | | | | | |
| 1 | C4F9—CH2CH(OH)CH2O—(CH2CH2O)9—C12H25 | 396 | 219 | 1.81 | 9.2 | Not dissolved |
| 2 | C4F9—CH2CH(OH)CH2O—(CH2CH2O)4—C18H37 | 176 | 219 | 0.8 | 4.9 | Not dissolved |
| 3 | C4F9—CH2CH(OH)CH2O—(CH2CH2O)10—C20H41 | 440 | 219 | 2.01 | 8.7 | Not dissolved |
| 4 | C4F9—CH2CH(OH)CH2O—(CH2CH2O)9—CH2CH(OH)CH2—C4F9 | 396 | 438 | 0.9 | 8.1 | Not dissolved |
| 5 | C8F17—CH2CH(OH)CH2O—(CH2CH2O)20—C18H37 | 880 | 419 | 2.1 | 10.8 | Not dissolved |
| 6 | C4F9—CH2CH(OH)CH2O—(CH2CH2O)9—CH3 | 396 | 219 | 1.81 | 11.3 | Not dissolved |
| 7 | C4F9—CH2CH(OH)CH2O—(CH2CH2O)23—CH3 | 1012 | 219 | 4.62 | 15.3 | Not dissolved |

TABLE 1-continued

| | | | | | | |
|---|---|---|---|---|---|---|
| 8 | C16H33O—(CH2CH2O)15—H | — | — | — | 14.6 | Dissolved |
| 9 | C18H33COO—(CH2CH2O)23—COC18H33 | — | — | — | 12.8 | Dissolved |

| | Water Solubility 5% | Water Solubility 50% | Static Surface Tension 0.10% [mN/m] | Dynamic Surface Tension 0.50% [mN/m] |
|---|---|---|---|---|
| Example | | | | |
| 1 | Dissolved | Dissolved | 24.2 | 34 |
| 2 | Dissolved | Dissolved | 23.8 | 34 |
| 3 | Dissolved | Dissolved | 30.5 | 45 |
| 4 | Dissolved | Uniform gel | 24.1 | 36 |
| 5 | Dissolved | Dissolved | 21.9 | 30 |
| 6 | Dissolved | Dissolved | 23.1 | 35 |
| 7 | Dissolved | Dissolved | 18.4 | 32 |
| 8 | Dissolved | Dissolved | 18.6 | 32 |
| 9 | Dissolved | Dissolved | 19.1 | 34 |
| Comparative Example | | | | |
| 1 | Not dissolved | Not dissolved | * | * |
| 2 | Not dissolved | Not dissolved | * | * |
| 3 | Not dissolved | Not dissolved | * | * |
| 4 | Not dissolved | Not dissolved | * | * |
| 5 | Not dissolved | Not dissolved | * | * |
| 6 | Not dissolved | Not dissolved | * | * |
| 7 | Not dissolved | Not dissolved | * | * |
| 8 | Suspended | Solid | 37.5 | 59 |
| 9 | Dissolved | Uniform gel | 34.8 | 61 |

In Table 1, "$MW_{EO}$" represents the molecular weight of the polyoxyethylene group (the moiety $(CH_2CH_2O)_a$), and "$MW_F$" represents the molecular weight of the fluoroalkyl groups (the moieties $C_nF_{2n+1}$ and $C_mF_{2m+1}$). "*" used in the surface tension columns indicates that it was impossible to conduct the measurement because an aqueous solution was not obtained at the predetermined concentration.

Production of Aqueous Coating Composition

"ZEFFLE SE310" (product of Daikin Industries, Ltd., water-based mixed resin emulsion of vinylidene fluoride resin/acrylic resin, pH=7, solids concentration: 51%) was used as a base emulsion. 10.0 parts by weight of water, 5.3 parts by weight of "SN5027" (product of San Nopco Limited) as a dispersant, 0.3 parts by weight of "FS013B" (product of Dow Corning Corporation) as an antifoaming agent, 4.0 parts by weight of ethylene glycol, 0.1 parts by weight of 28% ammonia water, and 70.0 parts by weight of "TIPAQUE CR97" (product of Ishihara Sangyo Kaisha, Ltd.) as titanium oxide were dispersed in water with a sand mill to prepare a pigment paste. Subsequently, 0.6 parts by weight of 28% ammonia water was added to 68.2 parts by weight of "ZEFFLE SE310", to which were then added 24.1 parts by weight of the pigment paste, 5.1 parts by weight of diethyl adipate, 0.1 parts by weight of "FS013B" (product of Dow Corning Corporation) as an antifoaming agent, 1.9 parts by weight of 10% aqueous solution of ADEKANOL UH420 (product of Asahi Denka Co., Ltd.) as a thickener, and 0.5 parts by weight of the compound obtained in Example 1 as a leveling agent. The mixture was stirred at 400 rpm for 1 hour, and to the resulting composition was added "Ethyl silicate 40" (product of Colcoat Co., Ltd., tetrameric condensate of tetraethoxysilane) in an amount of 7 g per 100 g of the resulting composition. The mixture was further stirred for 15 minutes, giving a coating composition.

Production of Aqueous Ink Composition

A titanium oxide dispersion was obtained by mixing 50 parts by weight of titanium oxide (product of Titan Kogyo Kabushiki Kaisha, trade name: KRONOS-KR270), 5 parts by weight of styrene-acrylic resin, 10 parts by weight of propylene glycol, and 35 parts by weight of ion-exchanged water. The above titanium oxide dispersion (50 parts by weight), 0.32 parts by weight of xanthan gum, 5 parts by weight of glycerin, 5 parts by weight of the compound obtained in Example 1, 38.25 parts by weight of ion-exchanged water, and 1.43 parts by weight of silicone emulsion (Dow Corning Toray Silicone Co., Ltd., trade name: SH7024) were mixed to prepare an ink composition suitable for use as an ink for ballpoint pens.

Production of Photographic Photosensitive Material

A polyethylene terephthalate film base with a thickness of 175 μm was coated with a silver halide emulsion layer, further coated with a protective layer, and then dried to prepare a monochrome silver halide photosensitive material. The emulsion layer was formed in a thickness of about 5 μm, and with the amount of silver applied being 5 g/m². The emulsion layer was designed to contain a silver halide with 1.5 mol % AgI and 98.5 mol % AgBr; 2.5 g/m² of gelatin as a binder; and 1-phenyl-5-mercaptotetrazole (0.5 g)/Ag (100 g) as an antifogging agent. The protective layer was formed in a thickness of about 1 μm, and was designed to contain 1.8 g/m² of gelatin as a binder, 7 mg/m² of N-oleoyl-N-methyltaurine sodium salt as a hardener, and 10 mg/m² of the compound obtained in Example 5 as an antistatic agent and antiadhesion agent.

The silver halide photosensitive material thus prepared not only prevented the occurrence of staining during development, adhesion between films, and static marks, but also showed excellent coatability and photographic characteristics (such as sensitivity).

The disclosures of the documents cited in the detailed description of the invention in the present specification are incorporated herein by reference.

INDUSTRIAL APPLICABILITY

Although the compound of the present invention has a fluoroalkyl group, which is a hydrophobic group, in its molecule, it is highly soluble in water, and when added to an aqueous solution, it is capable of greatly reducing surface tension. Therefore, the compound of the invention can be suitably used as, for example, a fluorine-containing water-soluble nonionic surfactant. Such a surfactant improves the wettability of an aqueous composition, and can be used in a wide range of fields. When the compound of the invention is used as an additive for aqueous compositions, because of its high water solubility the amount of organic solvent required in the aqueous compositions can be greatly reduced. The compound of the invention therefore provides the advantages of making it unnecessary to handle such compositions as dangerous substances, and of reducing detrimental effects on the environment.

The invention claimed is:

1. A compound represented by formula (1):

$$W—C_nF_{2n}—X—(CH_2CH_2O)_a—Y \qquad (1)$$

wherein
n is an integer from 2 to 6;
W is a hydrogen atom or a fluorine atom;
X is —COO—, —SO$_2$—N(R)—, -M-O— or —CH$_2$O-M-O— (wherein R is a lower alkyl group, and M is an alkylene group optionally substituted with a hydroxyl group);
a is an integer from 10 to 50; and
Y is a substituted or unsubstituted alkyl group having 4 to 19 carbon atoms, a substituted or unsubstituted aryl group, an alkenyl group, an alkynyl group, -M'-C$_m$F$_{2m}$—W' or -M'-OCH$_2$—C$_m$F$_{2m}$—W' (wherein m is an integer from 2 to 6, W' is a hydrogen atom or a fluorine atom, and M' is an alkylene group optionally having one hydroxyl group), the ratio of the molecular weight (MW$_{EO}$) of the polyoxyethylene group (the moiety (CH$_2$CH$_2$O)$_a$) to the molecular weight (MW$_F$) of the fluoroalkyl groups (the moieties W—C$_n$F$_{2n}$ and C$_m$F$_{2m}$—W') being within the range expressed by the equation:

$$MW_{EO}/MW_F = 2.2 \text{ to } 10$$

and the compound having a Griffin's HLB value of 10 to 16.

2. A compound represented by formula (1)':

$$C_nF_{2n+1}—CH_2CH(OH)CH_2—O—(CH_2CH_2O)_a—Y' \qquad (1)'$$

wherein
n is an integer from 2 to 6;
a is an integer from 15 to 50; and
Y' is —C$_b$H$_{2b+1}$ (wherein b is an integer from 11 to 19) or —CH$_2$CH(OH)CH$_2$—C$_m$F$_{2m+1}$ (wherein m is an integer from 2 to 6), the compound having a Griffin's HLB value of 10 to 16.

3. A compound represented by formula (1)' according to claim 2, wherein the ratio of the molecular weight (MW$_{EO}$) of the polyoxyethylene group (the moiety (CH$_2$CH$_2$O)$_a$) to the molecular weight (MW$_F$) of the fluoroalkyl groups (the moieties C$_n$F$_{2n+1}$ and C$_m$F$_{2m+1}$) is within the range expressed by the equation:

$$MW_{EO}/MW_F = 2.2 \text{ to } 10.$$

4. A compound represented by formula (1)' according to claim 2, wherein a is an integer from 20 to 45.

5. A compound represented by formula (1)' according to claim 2, wherein Y' is —C$_b$H$_{2b+1}$ (wherein b is an integer from 11 to 19).

6. A compound represented by formula (1)' according to claim 2, wherein Y' is —(CH$_2$)$_b$H (wherein b is an integer from 11 to 19).

7. A compound represented by formula (1)' according to claim 6, wherein
n is 4;
a is an integer from 20 to 45; and
b is an integer from 11 to 17.

8. A compound represented by formula (1)' according to claim 2, wherein Y' is —CH$_2$CH(OH)CH$_2$—C$_m$F$_{2m+1}$ (wherein m is an integer from 2 to 6).

9. A compound represented by formula (1)' according to claim 8, wherein n is 4; m is 4; and a is an integer from 20 to 45.

10. A compound according to claim 1, wherein the compound is represented by:
C$_4$F$_9$—COO—(CH$_2$CH$_2$O)$_{23}$—C$_{12}$H$_{25}$,
C$_4$F$_9$—SO$_2$N(CH$_3$)—(CH$_2$CH$_2$O)$_{21}$—C$_{12}$H$_{25}$,
C$_4$F$_9$—CH$_2$CH$_2$O—(CH$_2$CH$_2$O)$_{25}$—C$_{12}$H$_{25}$,
H(CF$_2$)$_4$—CH$_2$OCH$_2$CH(OH)CH$_2$O—(CH$_2$CH$_2$O)$_{21}$—C$_{14}$H$_{29}$,
C$_4$F$_9$—CH$_2$CH(OH)CH$_2$O—(CH$_2$CH$_2$O)$_{21}$—C$_{12}$H$_{25}$,
C$_4$F$_9$—CH$_2$CH(OH)CH$_2$O—(CH$_2$CH$_2$O)$_{25}$—C$_{12}$H$_{25}$,
C$_4$F$_9$—CH$_2$CH(OH)CH$_2$O—(CH$_2$CH$_2$O)$_{30}$—C$_{12}$H$_{25}$,
C$_4$F$_9$—CH$_2$CH(OH)CH$_2$O—(CH$_2$CH$_2$O)$_{20}$—C$_{14}$H$_{29}$,
C$_4$F$_9$—CH$_2$CH(OH)CH$_2$O—(CH$_2$CH$_2$O)$_{30}$—C$_{14}$H$_{29}$,
C$_4$F$_9$—CH$_2$CH(OH)CH$_2$O—(CH$_2$CH$_2$O)$_{23}$—C$_{16}$H$_{33}$,
C$_4$F$_9$—CH$_2$CH(OH)CH$_2$O—(CH$_2$CH$_2$O)$_{20}$—C$_{16}$H$_{33}$,
C$_4$F$_9$—CH$_2$CH(OH)CH$_2$O—(CH$_2$CH$_2$O)$_{25}$—C$_{16}$H$_{33}$,
C$_4$F$_9$—CH$_2$CH(OH)CH$_2$O—(CH$_2$CH$_2$O)$_{30}$—C$_{16}$H$_{33}$,
C$_4$F$_9$—CH$_2$CH(OH)CH$_2$O—(CH$_2$CH$_2$O)$_{40}$—C$_{16}$H$_{33}$,
C$_4$F$_9$—CH$_2$CH(OH)CH$_2$O—(CH$_2$CH$_2$O)$_{20}$—C$_{18}$H$_{37}$,
C$_4$F$_9$—CH$_2$CH(OH)CH$_2$O—(CH$_2$CH$_2$O)$_{30}$—C$_{18}$H$_{37}$,
C$_4$F$_9$—CH$_2$CH(OH)CH$_2$O—(CH$_2$CH$_2$O)$_{40}$—C$_{18}$H$_{37}$,
C$_4$F$_9$—CH$_2$CH(OH)CH$_2$O—(CH$_2$CH$_2$O)$_{23}$—CH$_2$CH(OH)CH$_2$—C$_4$F$_9$,
C$_4$F$_9$—CH$_2$CH(OH)CH$_2$O—(CH$_2$CH$_2$O)$_{35}$—CH$_2$CH(OH)CH$_2$—C$_4$F$_9$, or
C$_4$F$_9$—CH$_2$CH(OH)CH$_2$O—(CH$_2$CH$_2$O)$_{45}$—CH$_2$CH(OH)CH$_2$—C$_4$F$_9$.

11. A surfactant comprising a compound according to claim 1.

12. An antistatic agent comprising a compound according to claim 1.

13. A concentrated aqueous solution comprising a compound according to claim 1.

14. An aqueous coating composition comprising a compound according to claim 1.

15. An aqueous ink composition comprising a compound according to claim 1.

16. A photographic photosensitive material comprising a compound according to claim 1.

* * * * *